US006359100B1

(12) United States Patent
Hostettler et al.

(10) Patent No.: US 6,359,100 B1
(45) Date of Patent: Mar. 19, 2002

(54) METHODS OF PREPARING POLYURETHANE ADHESIVES, ADHESIVES PRODUCED THEREBY AND MEDICAL DEVICES EMPLOYING THE SAME

(75) Inventors: Fritz Hostettler, Ewing; Peter Wachtel, Union, both of NJ (US)

(73) Assignee: Bristol-Myers Squibb Company, New York, NY (US)

( * ) Notice: Subject to any disclaimer, the term of this patent is extended or adjusted under 35 U.S.C. 154(b) by 0 days.

(21) Appl. No.: 09/236,759

(22) Filed: Jan. 25, 1999

Related U.S. Application Data
(60) Provisional application No. 60/072,843, filed on Jan. 28, 1998.

(51) Int. Cl.$^7$ .............................................. C08G 18/24
(52) U.S. Cl. ........................................ 528/58; 528/905
(58) Field of Search ................................... 528/58, 905

(56) References Cited

U.S. PATENT DOCUMENTS

| 4,332,927 A | | 6/1982 | Simone ........................ 528/58 |
| 4,532,316 A | * | 7/1985 | Henn ........................... 528/59 |
| 4,966,953 A | | 10/1990 | Shikinami et al. ............ 528/60 |
| 5,591,820 A | * | 1/1997 | Kydonieus ................... 528/76 |

OTHER PUBLICATIONS

Seneker & Barksby; A New Generation of Polyether Polyols for the Urethane Industry; Utech Paper, 1996.*

* cited by examiner

*Primary Examiner*—Rachel Gorr
(74) *Attorney, Agent, or Firm*—Theodore R. Furman, Jr.

(57) ABSTRACT

A polyurethane adhesive composition preferably having pressure sensitive characteristics that is non-cytotoxic and methods of making the same which is especially useful for medical applications such as ostomy and wound care.

33 Claims, No Drawings

METHODS OF PREPARING POLYURETHANE ADHESIVES, ADHESIVES PRODUCED THEREBY AND MEDICAL DEVICES EMPLOYING THE SAME

This application claims the benefit of U.S. Provisional Application 60/072,843, filed Jan. 28, 1998.

FIELD OF THE INVENTION

The present invention is directed to a process for producing polyurethane adhesives, especially pressure sensitive adhesives utilizing a hydroxy-terminated urethane extended polyether (ester) polyol and a moderate range molecular weight diisocyanate. The resulting adhesives provide excellent adhesive and wear characteristics and are essentially non-cytotoxic making them particularly useful for medical applications such as in ostomy and wound care.

BACKGROUND OF THE INVENTION

The present invention is generally directed to the field of synthetic polymeric adhesive compositions, especially polyurethane adhesive compositions, particularly adapted for medical devices such as in the areas of ostomy, wound care and the like.

Adhesives have been used to affix ostomy appliances and wound dressings to the human body. Such appliances require a skin-contacting layer having an adhesive thereon which must be compatible with the skin. The cytotoxicity of the adhesive, measured by methods described in U.S. Pharmacopeia XXII, pp. 1495–1496, (1990) and supplement 9, pp. 3575–3576 (Sep. 15, 1993) incorporated herein by reference, cannot exceed a rating of 2 for use in such medical devices. In addition, many wound care applications use pressure-sensitive adhesives for adhesion of wound dressings to the patient's skin. Medical applications of this type require that the adhesive exhibit low cytotoxicity (i.e. grade levels of 2 or less, preferably zero).

Pressure-sensitive adhesives made with polyurethane polymers based on aliphatic, cycloaliphatic and araliphatic polyisocyanates, or prepolymers thereof, are especially attractive for use in medical devices. Such adhesives are transparent, non-discoloring, have a high degree of skin-tack and exhibit excellent adhesive and cohesive strength even after repeated removal and repositioning on the skin.

However, the polymerization of such polyisocyanates or prepolymers thereof, with hydroxyl-terminated polyols to form pressure-sensitive polyurethane adhesives must be performed in the presence of a catalyst. A variety of urethane-forming catalysts are disadvantageous because they are typically cytotoxic, not sufficiently active, catalyze undesirable oxidative degradation reactions and/or generate undesirable isocyanate trimers.

For example, most tertiary amines are not active enough for the polymerization of pressure-sensitive polyurethane adhesives from polyisocyanates or prepolymers thereof. Tertiary amines which are sufficiently active generally cause severe skin irritation and therefore cannot be used in medical applications. In addition, most tertiary amines have unacceptable grade levels of cytotoxicity.

Transition metal catalysts are also well known for use in the production of polyurethane adhesives. These catalysts are very potent but exhibit unacceptable cytotoxicity levels and often catalyze undesirable side reactions such as isocyanate trimerization. These undesirable side reactions tend to increase crosslink density and decrease desirable adhesive properties such as elongation, tear resistance and cohesive strength.

It is known in the art that transition metal catalysts formed from organic tin (II) salts and organotin (IV) compounds are highly efficient catalysts for the formation of polyurethane adhesives. They are advantageous because they do not catalyze the formation of isocyanate trimers.

Efforts have been made to employ acceptable catalysts for the formation of polyurethane adhesives. Much attention has been focused on the organic tin (II) salts and organotin (IV) compounds in the search for low cytotoxicity level catalysts for the formation of polyurethane adhesives.

For example, Melvin H. Gitlitz et al. "Kirk Othmer Encyclopedia of Chemical Technology", $3^{rd}$ Edition (1979) volume 23, pages 69–77 disclose that the toxicity of organic tin compounds is a reflection of their biological activity. The most toxic compounds are lower trialkyl organotin compounds such as trimethyl and triethyl tin derivatives. Di-organotin compounds as a class are substantially less toxic than the analogous tri-organotin compounds. It is stated that dialkyl tin chlorides and oxides generally show decreasing oral toxicity with increasing length of the alkyl chain. Mono-organotin compounds (e.g., monobutyltin sulfide) show decreasing toxicity with increasing alkyl chain length but have a lower order of toxicity than di-organotin compounds. Mono-alkyltin derivatives, however, do not exhibit as high a catalytic activity as dialkyl tin derivatives.

Further efforts have been made to identify transition metal catalysts which can polymerize polyisocyanates and polyols to form acceptable, non-toxic polyurethane adhesives. For example, U.S. Pat. No. 3,930,102 discloses a method of preparing pressure-sensitive polyurethane adhesives using tin (II)-ethyl hexoate, ferric acetyl acetonate, tin (II) naphthenate, or dibutyltin (IV) dilaurate. While the adhesives are stated to be optionally clear and color-stable, these catalysts exhibit unacceptable cytotoxicity even at moderate catalyst concentrations. They are therefore unacceptable for use in the production of polyurethane adhesives, especially for medical applications.

U.S. Pat. No. 4,661,099 discloses a method of producing polyurethane adhesives in the presence of catalysts which accelerate polyurethane formation. Dibutyltin dilaurate is used in high concentrations to catalyze the reaction. There is no mention of cytotoxicity testing of the pressure sensitive adhesive.

U.S. Pat. No. 4,332,927 discloses non-pressure sensitive polyurethane compositions for use in the manufacture of blood filters. The catalysts employed to form the adhesive include dialkyltin dicarboxylated compounds comprising linear or branched alkyl groups having less than 18 carbon atoms per molecule and carboxylate groups derived from monocarboxylic acids having from 2 to 18 carbon atoms per molecule, aliphatic carboxylic acids having from about 14 to about 20 carbon atoms per molecule and mixtures of the above. A major proportion of the carboxylate moiety comprises carboxylic acid derivatives. The hydroxy-function catalysts disclosed in the '927 Patent become part of the urethane matrix and may therefore require high cure temperatures on the order of 150 to 160° C. At such high temperatures, oxidative degradation of the polyether polymer chains likely occurs.

It would therefore be a significant advance in the art of the formation of polyurethane adhesives if a method could be employed to obtain polyurethane adhesives having exceptional properties including non-cytotoxicity.

It would be a further advance in the art to provide polyurethane adhesives, especially pressure adhesives which are non-cytotoxic and have excellent wear and strength properties.

SUMMARY OF THE INVENTION

The present invention is generally directed to polyurethane compositions, especially pressure-sensitive polyurethane compositions and to processes of making the same employing hydroxy-terminated urethane-extended prepolymers in which the formation of the prepolymer and of the polyurethane adhesive composition is performed in the presence of non-cytotoxic catalysts.

In particular, the present invention is, in part, directed to a method of preparing a polyurethane adhesive composition comprising:

a) reacting a polyol component selected from the group consisting of polyether polyols, polyester polyols and combinations thereof having at least 1.75 hydroxy groups per molecule with a diisocyanate compound selected from the group consisting of aliphatic, cycloaliphatic, and araliphatic diisocyanate compounds and combinations thereof in the presence of a non-cytotoxic catalyst to form an intermediate product having a viscosity of at least 5,000 cps when measured at a temperature of from about 25 to 35° C.; and b) reacting greater than a stochiometric amount of the intermediate product with an isocyanate compound having a functionality of at least 2.0 in the presence of a non-cytotoxic catalyst.

Polyurethane compositions prepared by the method are also encompassed by the present invention.

DETAILED DESCRIPTION OF THE INVENTION

The present invention is directed to the production of polyurethane adhesives, especially adhesives which are pressure-sensitive. It is highly desirable that the polyurethane adhesive compositions of the present invention be suitable for medical applications such as ostomy and wound care. In accordance with the present invention, those reactions requiring use of a catalyst are conducted with a non-cytotoxic catalyst, and in particular, a cytotoxicity grade level of no greater than 2.

In accordance with the present invention, there is first prepared a hydroxyl terminated urethane-extended prepolymer. The prepolymer is prepared by reacting one of a select group of polyether or polyester polyols, preferably linear or branched chain, having at least 1.75 hydroxy groups per molecule, with a diisocyanate compound in the presence of an effective amount of a non-cytotoxic catalyst.

Polyether polyol compounds used for the preparation of the hydroxyl terminated urethane-extended prepolymer are well known in the art. Such compounds can be prepared, for example, by the polymerization of epoxides, such as ethylene oxide, propylene oxide, or 1,2-butylene oxide in the presence of polyfuctional hydroxyl initiators and appropriate catalysts known to accelerate oxyalkylation reactions. For example, when using the cyclic epoxide tetrahydrofuran as the starting material, the oxyalkylation reaction proceeds in the presence of a Lewis acid catalyst. The resulting end groups are converted to hydroxyl moieties by means well known in the art. The low melting points of propylene oxide or ethylene/propylene oxide copolymer adducts, produce oxyalkylation products which are usually liquid at no higher than room temperature. Suitable oxyalkation catalysts for the 1,2-epoxides include alkali metal hydroxides and double metal cyanide catalysts.

Hydroxyl terminated polyethers may be prepared by the addition of the 1,2-epoxide with a compound having reactive hydrogen atoms. Preferred compounds having reactive hydrogen atoms include water, ethylene glycol, diethylene glycol, propylene glycol, dipropylene glycol, 1,3-propanediol and 1,4-butanediol, or mixtures thereof. These compounds are desirably employed when the desired polyethers are predominately difunctional.

When the desired functionality of the polyether is greater than two, the difunctional glycol initiators can also be admixed with smaller molar proportions of higher functional glycols, such as glycerol, trimethylolpropane, pentaerythritol, α-methylglucoside, sorbitol, and the like. Typically, it is desirable to maintain an average upper limit of the polyether polyol functionality in the range of about 2.5.

When the above-described oxyalkylation reactions of propylene oxide or 1,2-butylene oxide are performed in the presence of alkali metal hydroxides, such as potassium hydroxide, a competing side-reaction for oxyalkylation may be the isomerization of the cyclic 1,2-epoxide to allyl alcohol or 4-methylallyl alcohol. The presence of these alcohols present new active hydrogen initiators for the formation of monofunctional polyalkylene oxides (i.e. "monols"). These so called "monols" act as chain stoppers for the subsequent downstream formation of polyurethane polymers or urethane intermediates.

It is well established that when the average molecular weight of linear polypropyleneoxydiols increase in molecular weight, the "monol" content gradually increases so that an average molecular weight of 4,000 for the polypropyleneoxydiols may result in a 40 mol % content of monols. Under these circumstances, it becomes difficult to utilize the higher molecular weight polyetherdiol intermediates for the manufacture of polyurethane derivatives of the present invention.

There have been recent improvements regarding the double metal cyanide catalysis of 1,2-alkylene oxides to decrease the presence of monofunctional by-products (e.g. monols) over the conventional base catalysis of alkyl-substituted 1,2-alkylene oxide polyethers.

Polyether polyols which have been prepared by double metal cyanide catalysis are commercially available as the ACCLAIM® series of polyether polyols from the ARCO Chemical Company. The mol % "monol" content of these polyether polyols is typically less than 2 mol % preferably about 0.5 mol % or less. Polyether polyols of this type are preferred for use in the present invention to prepare hydroxyl-terminated urethane extended prepolymers.

The average molecular weight of the polyether polyols used for production of polyurethane adhesives in accordance with the present invention is generally in the range of from about 1,000 to 8,000. The preferred molecular weight is from about 1,500 to 6,000. These ranges are applicable to alkyl-substituted polyethers prepared from 1,2-alkylene oxides, as well as to copolyethers made from alkyl-substituted 1,2-epoxides and ethylene oxide. In the case of polyetherdolos made from tetrahydrofuran, a preferred average molecular weight range is from about 1,000 to about 4,000 with a most preferred range being from about 1,500 to 3,000. It will be understood that the polyether polyols mentioned above can be combined together as mixtures.

The polyester polyols can be difunctional and/or trifunctional and may be prepared from substituted or unsubstituted caprolactams especially ε-caprolactams and adducts thereof. The average molecular weight range for the polyester polyols is generally the same as for the polyether polyols, typically from about 1,000 to 8,000, preferably from about 1,500 to 6,000.

Polyester polyols can be used alone or in combination with polyether polyols to form the hydroxy terminated urethane extended prepolymer.

The polyether polyols or polyester polyols can be, where desired, combined with a compatible lower molecular weight hydroxy containing compound (e.g., a polyol) which will typically have a molecular weight of no more than about 900, more typically no more than about 500. The term "compatible" means that the two components are soluble in each other at the operating ratios defined hereinafter.

The amount of the lower molecular weight hydroxy containing compound is such that the operating molar ratio of the lower molecular weight hydroxy group containing compound and the polyether polyol or polyester polyol is from about 0.25 to 1.25:1. The lower molecular weight hydroxy containing compound is preferably combined with the starting material (i.e., polyether or polyester polyol) before the addition of the diisocyanate compound for the purpose of forming the prepolymer.

The lower molecular weight hydroxy group containing compound increases the concentration of urethane groups per repeating polymer unit. It appears that the degree of skin tack and other characteristics such as cohesive strength of the polyurethane adhesive depend to a significant extent upon the molar concentration of the polar urethane group (—NHCOO—), per repeating chain segment of the adhesive matrix polymer.

The selection of the lower molecular weight hydroxy group containing compound for blending with the polyether polyol or polyester polyol depends upon the molecular structure and miscibility parameters of both components. It has been observed that polyoxyalkylene diols derived from propylene oxide, or mixtures of propylene oxide and small quantities of ethylene oxide, are compatible with lower molecular weight oxypropylene polyols such as propylene glycol, dipropylene glycol, tripropylene glycol or mixtures thereof typically having a molecular weight of from about 75 to 300. Lower molecular weight hydroxy containing compounds which are readily compatible with polyether polyols having high proportions of ethylene oxide as well as polyester polyols are, for example, ethylene glycol, diethylene glycol, triethylene glycol, tetraethylene glycol, glycerol, trimethylolpropane, low molecular weight ethylene oxide derivatives of glycerol and trimethylolpropane, as well as mixtures of the above-mentioned compounds. The typical molecular weight of these compounds is from about 60 to 300.

The polyether polyols and/or polyester polyols described above are reacted with a diisocyanate compound to form the hydroxy terminated urethane extended prepolymer required for the formation of polyurethane adhesives in accordance with the present invention. The diisocyanate compound is selected from aliphatic, cycloaliphatic and araliphatic diisocyanate compounds. Typical examples of the diisocyanate compounds employed for the preparation of the prepolymer include 1,4-tetramethylene diisocyanate, 1,6-hexamethylene diisocyanate, 1,4-cyclohexyl diisocyanate, isophorone diisocyanate (1-isocyanato -3,3,5-trimethyl-5-isocyanatomethylcyclohexane), methylene bis (4-cyclohexyl) isocyanate isomers, meta-xylylene diisocyanate and mixtures thereof.

In the present invention the polyether polyol and/or polyester polyol described above is reacted with the diisocyanate compound in the presence of a catalytically effective amount of a non-cytotoxic catalyst. Examples of these catalysts are those selected from the group consisting of dialkyltin mono-and-di-carboxylates, wherein the alkyl group is a straight or branched chain alkyl group having from 6 to 10 carbon atoms with each of said carboxylate groups being a straight or branched chain group having from 2 to 12 carbon atoms, wherein the resulting hydroxy terminated urethane extended prepolymer has a cytotoxicity grade level of from 0 to 2 as defined in, for example U.S. Pharmacopeia XXII, pp. 1495–1496, (1990) and supplement 9, pp. 3575–3576 (Sep. 13, 1993), incorporated herein by reference.

In accordance with the present invention, it was noted that the alkyl groups of dialkyltin mono-and di-carboxylates generally should not exceed 10 carbon atoms, and the chain length of the carboxylate groups should not exceed 12 carbon atoms because the solubility of the dialkyltin mono-and-di-carboxylate catalyst in the polyol can become unacceptable (i.e., the catalyst is too hydrophobic). It has further been found that alkyl groups below 6 carbon atoms can be disadvantageous because such catalysts are cytotoxic having cytotoxic grade levels of at least 3.

The preferred alkyl group for the dialkyl tin mono-and di-carboxylates is an octyl group. The preferred carboxylate groups for the catalyst include acetate, propionate, caproate, ethylhexoate and laurate.

The molecular weight of the catalyst is generally in the range of from 370 to about 2,500. It will be understood that some of the catalysts, e.g., dioctyl tin monolau rate may be in the form of an oligomer and thus have a molecular weight towards the higher end of the range. It is preferred that the catalysts are compatible in the polyol at temperatures of from about 10° C. to 40° C. This insures that the polymerization reaction between the polyol and the isocyanate will take place at desirable temperatures, typically in the range of from about room temperature to about 100° C.

The effectiveness of the catalyst is related to the concentration level under which the catalyst is miscible with the polyol. As previously indicated, the catalyst should be compatible with the polyol at temperatures of from about 10° C. to 40° C. If the catalyst is not sufficiently miscible in the polyol, the catalyst is inefficient in polymerizing the reaction of the polyol and the diisocyanate. For this reason, the activity of the catalyst and its molecular weight can be important factors. Consequently, the effectiveness of the catalyst not only relates to solubility of the catalyst in the polyol but also to the level of the catalyst in the mixture of the polyol and the isocyanate compound. It is for these reasons, that the length of the alkyl chain (6–10 carbon atoms) and the length of the carboxylate group (2 to 12 carbon atoms) can be important features related to the effectiveness of the catalyst for the production of polyurethane adhesives.

Preferred catalysts for the polymerization of polyurethane adhesives in accordance with the present invention include, for example, di-n-hexyltin diacetate, di-n-hexyltin dipropionate, di-n-hexyltin dicaproate, di-n-hexyltin di-2-ethylhexoate, di-n-hexyltin mono-2-ethylhexoate, di-n-hexyltin dilaurate, di-n-hexyltin monolaurate, di-2-ethylhexyltin diacetate, di-2-ethylhexyltin dicaproate, di-2-ethylhexyltin di-2-ethylhexoate, di-2-ethylhexyltin dilaurate, di-2-ethylhexyltin monolaurate and the like. Particularly preferred catalysts which exhibit both superior solubility in the polyol and excellent catalytic activity are dioctyltin carboxylates especially dioctyltin diacetate, dioctyltin monolaurate, and dioctyltin dilaurate.

The concentration of the catalyst for polymerization of the polyol and the isocyanate compound to form the hydroxyl terminated prepolymer is generally at least 0.02% by weight, based on the total weight of the reactants (polyol and diisocyanate) composition. A typical amount of the catalyst is from about 0.02 to 0.1% by weight.

It is an important feature of the present invention that the catalyst be added to the polyol and that the catalyst be fully compatible with the polyol at temperatures of from about 10° C. to 40° C. in order to avoid significant deviation of the desired molecular weight and molecular weight distribution of the polyurethane adhesive.

The polymerization reaction for the formation of the hydroxyl terminated prepolymer is, as previously indicated, typically in the range of from about room temperature to about 100° C., preferably at a temperature of from about room temperature to about 80° C., for a time sufficient to form the prepolymer.

The hydroxy-terminated urethane-extended prepolymers described above may be produced in the following manner. The polyol component (e.g., ACCLAIM®) is reacted with an aliphatic, cycloaliphtic of aralphatic diisocyanate to form a medium molecular weight hydroxyl-terminated polymeric urethane polyaddition polymer intermediate. As previously indicated, the reaction may be conducted in the presence of a lower molecular weight hydroxy containing compound in which the molar ratio of the lower molecular weight compound to the polyol starting material is from about 0.25 to 1.25:1.0. The lower molecular weight hydroxy containing compound desirably forms a fully compatible solution before addition of the chain-extending diisocyanate. The reaction is catalyzed by one of the previously discussed non-cytotoxic catalysts in an amount typically from about 0.02 to 0.1% by weight based on the weight of the polyol and diisocyanate to achieve a reasonably short reaction time during the polyaddition reaction.

The addition of the starting polyether and/or polyester polyol alone or in combination with the lower molecular weight hydroxy containing compound into the reaction vessel is made under conditions which substantially eliminate outside moisture. One such way of ensuring this condition is by the employment of a dry nitrogen stream.

The non-cytotoxic catalyst in an amount typically from about 0.02 to 0.1% by weight, is added to the polyol mixture and blended until a homogeneous mixture is obtained. The mixture is heated to a preferred temperature of from about room temperature to about 80° C., followed by the addition of the diisocyanate compound at a rate of addition that avoids an exotherm formation of a temperature higher than about 80° C. After addition of the desired amount of the diisocyanate compound, the contents of the vessel are stirred until the presence of NCO cannot be detected by typical analysis. The resulting polyol addition product is analyzed for hydroxyl content in a conventional manner to determine the equivalent weight per hydroxyl group of the hydroxyl-terminated prepolymer.

The resulting hydroxyl terminated prepolymer has a minimum viscosity of at least 5,000 and typically from about 5,000 to 20,000 cps at a temperature of from about 25 to 35° C. The desirable viscosity substantially eliminates beading of the mixture as it goes through the polymerization process, when deposited on a silicon treated release paper. The thus formed prepolymer is reacted with an isocyanate compound having a functionality of at least 2.0 in the presence of a non-cytotoxic catalyst in an amount of typically from about 0.5 to 1.5% by weight based on the total weight of the polyurethane adhesive composition.

The isocyanate compounds have a preferred functionality of at least 3, most preferably from about 3.0 to 3.6. The preferred triisocyanates (functionality of at least 3.0) are commercially available and include the DESMODUR series of isocyanates obtained from Bayer AG. This series of triisocyanates has a functionality typically from about 3.1 to 3.6 and an isocyanate equivalent weight of from about 190 to 210. Specifically, examples include DESMODUR N3300 having a functionality of from about 3.4 to 3.6 and an isocyanate equivalent weight of from about 190 to 200. Another preferred example is DESMODUR XP7100 which has a functionality of from about 3.1 to about 3.3 and an isocyanate equivalent weight of from about 200 to 210.

Other isocyanate compounds which may be employed in the reaction with the prepolymer to produce the polyurethane adhesives are disclosed in W. F. Gum et al. (Reaction Polymers), Chapter II, pages 58–61 (1992) and Polyurethane Handbook edited by Gunter Oertel, Chapter 3.2, Isocyanates, pages 73–81 and 87–82 (1993), each of which is incorporated herein by reference. All of the polyisocyanates employed for the production of the polyurethane adhesives are selected from aliphatic, cycloaliphatic and aralphatic polyisocyanates as well as cyclicpolyisocyanurate and polyfunctional biuret derivatives from such monomeric polyisocyanates. The polyisocyanates employed in the present invention are preferably those that produce transparent adhesives which are color stable and suitable for medical uses such as ostomy and wound care.

The polyurethane adhesive composition produced in accordance with the present invention typically has a molar excess of hydroxyl groups of at least 10%, typically in the range of from about 10% to 40% over fully reacted isocyanate groups. In a preferred form of the invention, the adhesive matrix exhibits a grade level cytotoxicity of from 0 to no more than about 2 and contains a residual amount of the non-cytotoxic catalyst in the range of from about 0.5% to 1.5%.

The reaction of the prepolymer and the isocyanate compound to form the polyurethane pressure sensitive adhesive is conducted so that the isocyanate index [expressed as the ratio of total equivalents (EQ) of isocyanate to total equivalents of active hydrogen compounds (hydroxyl, amine and water×100)], is typically in the range of from about 50 to 90, preferably from about 65 to 85. Operating within these ranges provides the polyurethane pressure sensitive adhesive with desirable tack properties.

The pressure-sensitive polyurethane compositions of the present invention may also contain, fillers, synthetic zeolites, pigments, dyes, stabilizers, tackifiers, plasticizers, combinations thereof and other additives which are known in the polyurethane chemistry.

Tackifiers such as those conventionally employed in the preparation of polyurethane adhesives can be used to widen the useful operating window for the achievement of reproduceable and acceptable skin tack as well as other properties. In fact, the use of tackifiers can provide a dramatic improvement in the cytotoxicity levels of the polyurethane compound.

Thus, tackifiers can effectively shift the isocyanate equivalent value in order to modify the polyurethane composition according to need. Typical tackifiers include terpene phenol resins, rosin ester derivatives, and related products, having slightly polar characteristics. The amount of tackifier employed in the composition is typically no more than about 15% by weight, most typically from about 5 to 15% by weight based on the weight of the polyurethane adhesive composition. The tackifier can be added and melt blended if necessary during or after preparation of the hydroxyl terminated prepolymer.

The polymerization reaction of the hydroxyl terminated prepolymer and the isocyanate compound is typically conducted at a temperature from 80 to 145° C., preferably from 100 to 135° C. and most preferably from about 120 to 130° C. with the desire of having a relatively short cure time. The polymerization reaction is preferably conducted in a continuous cure tunnel at a residence of time of less than 5 minutes, typically from about 1.5 to 3 minutes.

The present invention may be employed to prepare self-adhesive sheet-like structures in the medical field, in particular for ostomy devices, wound plasters, wound dressings, gauze bandages, and the like. The adhesive composition can also contain antimicrobial drugs, antibiotics, drugs for transdermal absorption, electrical conduction chemicals, superabsorbers for removal of wound exudate, growth factor compounds efficient in wound healing, and the like, provided these materials do not adversely effect the cross-linking reaction of the pressure-sensitive urethane matrix polymer.

EXAMPLES

Examples 1–4

18,800 grams of ACCLAIM 3201 (ARCO Chemical Company; HO-Number: 36.8), a polyetherdiol comprising a copolyether of about 80% by weight of oxypropylene and about 20% by weight of oxyethylene, and a calculated molecular weight of about 3049, was combined with 414 grams of dipropylene glycol (DPG: MW 134.2), 8.0 grams (about 0.04%, by weight based on the weight of the polyol component and diisocyanate) of dioctyltin dilaurate. The mixture was sparged with dry nitrogen gas at room temperature and stirred until a homogeneous clear blend was obtained.

A total of 1,037 grams of 1,6-hexamethylene diisocyanate (MW=168.2), available from Bayer AG as DESMODUR H, was added to the reactant mixture while continuously sparging with a moderate stream of dry nitrogen. Within about 20 to 30 minutes, the exothermic reaction proceeded to a clear solution having a temperature of from about 65 to 70° C. When the exotherm subsided, the reactants were heated to a temperature of from 75 to 80° C. and stirred for 3.5 hours at which time NCO groups could no longer be detected, thus demonstrating that the resultant prepolymer reaction had consumed all available polyisocyanate.

After cooling the resulting HO-terminated prepolymer to 50° C., an additional 208 grams of dioctyltin dilaurate was added thereto, corresponding to approximately 1 % by weight, based on the total quantity of the polyurethane adhesive composition described hereunder. Upon analysis of the above composition, identified as Component B for the formation of the matrix polymer, the HO-Number found by means of the phthalic anhydride analysis for hydroxyl content in polyether polyols was found to be 16.90, corresponding to a hydroxyl equivalent weight of approximately 3,320, or a calculated molecular weight of about 6,640.

For each 100 gram aliquots of the above-described hydroxyl-terminated polyether blend Component B, respective amounts of Isocyanate Component A, namely, a triisocyanurate DESMODUR XP7100 (Bayer AG; NCO=20.6%, corresponding to an Isocyanate equivalent weight of 204), were utilized at ISOCYANATE INDEX (I.E.) Levels of from 70.0 to 77.5 to determine pressure-sensitive adhesive performance and cytotoxicity characteristics of the resulting polyurethane adhesives. For the purpose of preparing the pressure-sensitive polyurethane adhesive matrix polymer, calculated aliquots at weight ratios of Component A: Component B were used as follows:

TABLE 1

|  | Isocyanate Index (I.E.) | Component A, Parts by Wt. | Components B, Parts by Wt. |
| --- | --- | --- | --- |
| Ex. 1 | 77.5 | 4.66 | 100 |
| 2 | 75.0 | 4.51 | 100 |
| 3 | 72.5 | 4.36 | 100 |
| 4 | 70.0 | 4.21 | 100 |

The reactant Components A and B for the preparation of the pressure-sensitive polyurethane matrix adhesive polymer were held at a constant temperature of 30° C., for a period of at least 24 hours, weighed into an appropriate plastic container and subsequently mixed at relatively high mixing speed for about 5 minutes to simulate what might occur in a high speed polyurethane elastomer dispensing unit. Next, the ingredients were stirred for an additional period of from 20 to 30 minutes at about 30° C. to simulate conditions which can prevail in a coatings through for dispensing said polymerizing urethane mixture onto a silicone-coated release paper.

The second step, dealing with the formation of the pressure-sensitive polyurethane adhesive was conducted by converting the hydroxyl-terminated prepolymer of step 1 to the pressure-sensitive adhesive matrix after addition of more of the non-cytotoxic organotin catalyst to said hydroxyl-terminated prepolymer and admixing this prepolymer/catalyst blend at appropriate equivalent ratios of said blend with the calculated amount of equivalents of a stable relatively low MW polyisocyanate and heating said intermediate blends of Component A (Isocyanate Component) and Component B (Hydroxyl/Catalysts blend) in the desired ratios and curing the resulting reactant mixture for from about 1.5 to 3 minutes at temperatures of from about 80 to about 145° C., preferably from about 120 to about 140° C.

The pressure-sensitive adhesive polymer matrix was deposited onto a silicone-treated release paper on one side (bottom side of the flat sheet structure), and adhered onto a woven or non-woven fabric on the top-side. The latter is preferably exposed to corona-treatment before it is affixed to the upper side of said virtually cured pressure-sensitive polyurethane matrix polymer sheet exiting from the curing tunnel or oven under conditions described below.

The oven temperature was adjusted to 125° C., and after a residence time of from 1.5 to 2.5 minutes under these conditions, the coated adhesive was removed from the heat source and affixed to a fabric upper (generally VERATEC PET fabric, a material well-known in the medical tape industry). It was found highly advantageous to corona-treat the VERATEC fabric just prior to affixing it to the top-side of the sheet-like laminate structure. Furthermore, optimal adhesion characteristics to said fabric could be achieved by post-cure of the resulting laminated sheet at temperatures of from about 40 to as high as 70° C., depending on polymer composition and length of exposure of said sheet at a given temperature. These parameters are well understood by those skilled in the art.

The tacky adhesive matrix surface and the corona-treated fabric surface were bonded together by means of pressure-rollers exerting relatively moderate pressure on the sheet structure such that the adhesive matrix does not strike through the fabric surface, but is securely anchored thereon. If desired, the resulting sheet structure can be heated to moderate temperatures for a finite time period to maximize adhesion characteristics onto the fabric surface to minimize or completely eliminate formation of adhesive residues on the skin surface or cohesive failure from the fabric, when removing the adhesive plaster from the skin of a patient or from the release paper.

The pressure-sensitive polyurethane adhesive material prepared at the I.E. level of 72.5 exhibited the best skin-tack when applied to human skin for a period of several days even when exposed to moisture from perspiration or daily showers. Upon removal of the adhesive plaster from the skin, there was no noticeable polymer residue on the skin, the material could be readily separated from human hair, and could be affixed to human skin again after repeated removal of the adhesive plaster. Moreover, the pressure-sensitive adhesive at I.E. 72.5 exhibited a cytotoxicity of zero when tested by an outside source (TOXIKON). The materials at the other I.E. ranges also exhibited generally good pressure-sensitive characteristics and exhibited cytotoxicity values of 0, or 1.

Example 5

2 moles of ACCLAIM 2200 (a polyoxypropylene diol from Arco Chemical Co. HO-number=55.0; molecular weight~2040), 1 mole of dipropylene glycol (MW~134.2) and 2 moles of DESMODUR H, sufficient to provide a 1,500 gram charge were reacted in a manner described in connection with Examples 1–4 in the presence of 0.04% by weight of dioctyl tin dilaurate.

The polyol and dipropylene glycol were charged to a two-liter flask which had been flushed with dry nitrogen. The diisocyanate was then added and a homogeneous solution was formed. After the exothermic reaction subsided, the mixture was heated to 75–80° C for a period of about 3 hours or until no more NCO was detected by IR analysis. The OH number and equivalent weight per OH were determined and the results are shown below in Table 3.

Examples 6–8

Example 5 was repeated for Examples 6–8 employing the reactants shown in Table 2.

TABLE 2

| EXAMPLE | COMPOSITION | MOLAR RATIO |
|---|---|---|
| 6 | ACCLAIM 4200* | 2 |
|   | dipropylene glycol | 1 |
|   | DESMODUR H | 2 |
| 7 | ACCLAIM 2200 | 2 |
|   | polyoxypropylene diol | 1 |
|   | DEMODUR H | 2 |
| 8 | ACCLAIM 2200 | 3 |
|   | glycerol-oxylpropylene adduct | 1 |
|   | DESMODUR H | 3 |

*polyoxypropylene diol OH-28.3 MW~3965

The OH number and equivalent weight per OH are shown in Table 3.

Example 9

Example 5 is repeated except that DESMODUR H is replaced with an equivalent amount of Desmodur W [methylene bis (4-cyclohexyl isocyanate) isomer mixture (MW=262.35)].

The OH number and equivalent weight per OH is shown in Table 3.

Example 10

Example 9 is repeated except that ACCLAIM 2200 is replaced by ACCLAIM 3201. The OH number and equivalent weight of the hydroxyl terminated prepolymer of Example 10 is shown in Table 3.

TABLE 3

| EXAMPLE | HO-Number | EQ. Weight. Per OH |
|---|---|---|
| 5 | 25.1 | ~2235 |
| 6 | 13.2 | ~4250 |
| 7 | 23.6 | ~2377 |
| 8 | 23.4 | ~2397 |
| 9 | 16.6 | ~3380 |
| 10 | 13.0 | ~2368 |

Examples 11–16

A 40 gram specimen of the prepolymers prepared in Examples 5–10 were prepared using the catalyst and the amount of the isocyanate component shown in Table 4.

TABLE 4

| Prepolymer | | | XP7100; gms added At "Isocyanate Index" Listed | | | |
|---|---|---|---|---|---|---|
| Example | Weight gms | Catalyst added gms | 80.0:gms XP7100 | 75.0: gmsX P7100 | 72.5:gms XP7100 | 70.0:gms XP7100 |
| 11 | 40.0 | 0.04[1] | 2.92 | 2.74 | 2.65 | 2.56 |
| 12 | 40.0 | 0.04[1] | 1.54 | 1.44 | 1.39 | 1.34 |
| 13 | 40.0 | 0.04[1] | 2.74 | 2.57 | 2.49 | 2.40 |
| 14 | 40.0 | 0.04[1] | 2.72 | 2.55 | 2.47 | 2.38 |
| 15 | 40.0 | 0.03[2] | 1.93 | 1.81 | 1.75 | 1.69 |
| 16 | 40.0 | 0.025[3] | 2.76 | 2 59 | 2.50 | 2.42 |

[1]Diocytyltin dilaurate;
[2]Dioctyltin monolaurate;
[3]Dioctyl diacetate

All of the above pressure-sensitive adhesive specimens exhibit pressure-sensitive adhesive characteristics and a cytotoxicity level of from 0 to 2.

Example 17

100 grams of the hydroxyl-terminted polyether blend Component B prepared as described in Examples 1–4 was preheated to 150° C. in a reaction vessel. 7.0 g of SP553, a terpene phenolic tackifier from Schenectady International, was melted at 150° C. and added to Component B. 4.41 g XP-7100 from Bayer AG, preheated to 50° C., was then added under nitrogen with stirring, followed by 1.0 g dioctyl tin dilaurate, a catalyst from Cardinal Chemical Company. The resultant pressure-sensitive adhesive had excellent tack and zero cytotoxicity.

Example 18

A pressure-sensitive adhesive was prepared as in Example 17 except that 7.0 g of Pentalyn H was used as the tackifier. The resultant pressure-sensitive adhesive also had excellent tack and zero cytotoxicity.

Example 19

A pressure-sensitive adhesive was prepared as in Examples 17 and 18 except that 7.0 g of Regalrez 1018, a tackifier from Hercules Chemical Company, was used as the tackifier, and heating over 30° C. was not necessary. (The Regalrez 1018 tackifier has the advantage of being liquid at room temperature so that it does not require heat to effect melting, and all ingredients can be mixed at 30° C. without additional heating.) The resultant pressure-sensitive adhesive had excellent tack and zero cytotoxicity.

What is claimed is:

1. A method of preparing a pressure sensitive polyurethane adhesive composition comprising:
   a) reacting a polyol component selected from the group consisting of polyether polyol, a polyester polyol, and combinations thereof having at least 1.75 hydroxyl groups per molecule in the presence of a compatible lower molecular weight hydroxy group containing compound with a diisocyanate compound selected from the group consisting of aliphatic, cycloaliphatic, and araliphatic diisocyanate compounds and mixtures thereof in the presence of a non-cytotoxic catalyst to form a hydroxy-terminated intermediate product having a viscosity of at least 5,000 cps when measured at a temperature of from about 25 to 35° C.; and
   b) reacting greater than a stoichiometric amount of said intermediate product with an isocyanate compound having a functionality of at least 2.0 in the presence of a non-cytotoxic catalyst to produce said pressure sensitive polyurethane adhesive composition having a molar excess of hydroxyl groups of at least 10% and having sufficient skin-tack and adhesive and cohesive strength to support attachment of a medical appliance to skin even under repeated use.

2. The method of claim 1 wherein the number of hydroxy groups per molecule of the polyol component is at least 2.0.

3. The method of claim 1 wherein the number of hydroxy groups per molecule of the polyol component is about 2.5.

4. The method of claim 1 wherein the polyol component has a monol content of less than 2 mol %.

5. The method of claim 4 wherein the monol content is no more than about 0.5 mol %.

6. The method of claim 1 wherein the polyol component has an average molecular weight of from about 1,000 to 8,000.

7. The method of claim 6 wherein the polyol component has an average molecular weight of from about 1,500 to 6,000.

8. The method of claim 1 wherein the lower molecular weight hydroxy group containing compound has a molecular weight of no more than about 900.

9. The method of claim 8 wherein the molecular weight of the lower molecular weight hydroxy group containing compound is no more than about 500.

10. The method of claim 1 wherein the lower molecular weight hydroxy group containing reactant is selected from the group consisting of ethylene glycol, diethylene glycol, triethylene glycol, tetraethylene glycol, propylene glycol, dipropylene glycol, glycerol, trimethylolpropane, low molecular weight ethylene oxide derivatives of glycerol and trimethylolpropane and mixtures thereof.

11. The method of claim 1 wherein the molar ratio of the lower molecular weight hydroxy group containing compound and the polyol component is from about 0.25 to 1.25:1.

12. The method of claim 1 wherein the diisocyanate compound is selected from the group consisting of 1,4-tetramethylene diisocyanate, 1,6-hexamethylene diisocyanate, 1,4-cyclohexyl diisocyanate, isophorone diisocyanate (1-isocyanato -3,3,5-trimethyl-5-isocyanato-methylcyclohexane), methylene bis (4-cyclohexyl) isocyanate isomers, meta-xylylene diisocyanate and mixtures thereof.

13. The method of claim 1 wherein the non-cytotoxic catalyst has a cytoxicity grade level of from zero to 2.

14. The method of claim 13 wherein the non-cytotoxic catalyst has a cytotoxicity grade level of zero.

15. The method of claim 1 wherein the non-cytotoxic catalyst is selected from the group consisting of dialkyltin mono-and di-carboxylates wherein the alkyl group has 6 to 10 carbon atoms and the carboxylate groups have from 2 to 12 carbon atoms.

16. The method of claim 15 wherein the alkyl group is an octyl group.

17. The method of claim 15 wherein the carboxylate groups are selected from the group consisting of acetate, propionate, caproate, ethylhexoate and laurate.

18. The method of claim 16 wherein the carboxylate group is laurate.

19. The method of claim 1 wherein the non-cytotoxic catalyst has a molecular weight of from about 370 to 2,500.

20. The method of claim 1 wherein the non-cytotoxic catalyst is compatible with the polyol component at a temperature of from about 10 to 40° C.

21. The method of claim 1 comprising reacting the polyol component and the diisocyanate compound at a temperature of from about room temperature to 100° C.

22. The method of claim 21 wherein the temperature is from about room temperature to 80° C.

23. The method of claim 15 wherein the non-cytotoxic catalyst is selected from the group consisting of di-n-hexyltin diacetate, di-n-hexyltin dipropionate, di-n-hexyltin dicaproate, di-n-hexyltin di-2-ethylhexoate, di-n-hexyltin mono-2-ethylhexoate, di-n-hexyltin dilaurate, di-n-hexyltin monolaurate, di-2-ethylhexyltin diacetate, di-2-ethylhexyltin dicaproate, di-2-ethylhexyltin di-2-ethylhexoate, di-2-ethylhexyltin dilaurate, di-2-ethylhexyltin monolaurate and combinations thereof.

24. The method of claim 1 comprising conducting step (a) in the presence of at least 0.02% by weight of the non-cytotoxic catalyst based on the total weight of the polyol component and diisocyanate.

25. The method of claim 24 wherein the amount of the non-cytotoxic catalyst is from about 0.02 to 0.1% by weight.

26. The method of claim 1 comprising conducting step (b) in the presence of from about 0.5 to 1.5% by weight of the non-cytotoxic catalyst based on the total weight of the polyurethane adhesive composition.

27. The method of claim 1 wherein the isocyanate compound has a functionality of at least 3.0.

28. The method of claim 27 wherein the isocyanate compound has a functionality of from about 3.1 to 3.6.

29. The method of claim 1 further comprising adding at least one additive to the reaction selected from the group consisting of fillers, synthetic zeolites, pigments, dyes, stabilizers, tackifiers, plasticizers and combinations thereof.

30. The method of claim 29 comprising adding a tackifier to the reaction in an amount of no more than about 15% by weight based on the total weight of the polyurethane adhesive composition.

31. The method of claim 30 wherein the tackifier is present in an amount of from about 5 to 15% by weight based on the total weight of the polyurethane adhesive composition.

32. The method of claim 1 comprising conducting step (b) at a temperature of from about 80 to 145° C.

33. The method of claim 1 comprising reacting greater than a stochiometric amount of said intermediate product with an isocyanate compound selected from the group consisting of aliphatic, cycloaliphatic and araliphatic isocyanate compounds.

* * * * *